United States Patent [19]
Blackman et al.

[11] Patent Number: 6,010,228
[45] Date of Patent: Jan. 4, 2000

[54] WIRELESS EMERGENCY SAFETY LIGHT WITH SENSING MEANS FOR CONVENTIONAL LIGHT SWITCH OR PLUG RECEPTACLE

[75] Inventors: Stephen E. Blackman, 248 Columbia Turnpike, Florham Park, N.J. 07932; Thomas Wolfgang, Dover, Pa.

[73] Assignee: Stephen E. Blackman, Florham Park, N.J.

[21] Appl. No.: 08/969,788

[22] Filed: Nov. 13, 1997

[51] Int. Cl.[7] ..................................... F21V 33/00
[52] U.S. Cl. .............. 362/95; 362/20; 362/276; 362/802
[58] Field of Search ............... 362/20, 95, 276, 362/802

[56] References Cited

U.S. PATENT DOCUMENTS

| | | | |
|---|---|---|---|
| 4,001,803 | 1/1977 | Lombardo | 340/656 |
| 4,514,789 | 4/1985 | Jester | 362/95 |
| 4,631,649 | 12/1986 | McCue et al. | 362/183 |
| 4,982,176 | 1/1991 | Schwarz | 340/567 |
| 5,309,145 | 5/1994 | Branch et al. | 340/540 |
| 5,473,517 | 12/1995 | Blackman | 362/95 |
| 5,523,927 | 6/1996 | Gokey | 362/103 |

*Primary Examiner*—Thomas M. Sember
*Assistant Examiner*—Ronald E. Delgizzi
*Attorney, Agent, or Firm*—Ezra Sutton

[57] ABSTRACT

A housing for a wireless emergency safety light which is mechanically connectable to a conventional light switch for a light fixture or a plug receptacle for providing power to a load. The housing replaces a conventional switch plate having at least one opening for receiving the switch actuator of the light switch or for receiving the electrical plug receptacle. The emergency safety light includes at least one compartment in the housing for receiving batteries; a second compartment in the housing for receiving an emergency light source adapted to be connected to the batteries; and an antenna for sensing the loss of electrical power to the light switch and, in response thereto, for actuating the emergency light source.

30 Claims, 10 Drawing Sheets

WIRELESS EMERGENCY SAFETY LIGHT WITH SENSING MEANS FOR CONVENTIONAL LIGHT SWITCH OR PLUG RECEPTACLE

FIELD OF THE INVENTION

The invention relates to a housing for a wireless emergency light source and, more particularly, a wireless emergency light source for automatically illuminating an area in response to a power failure.

BACKGROUND OF THE INVENTION

This invention is a further improvement of the inventions set forth in U.S. Pat. No. 5,473,517 and U.S. application Ser. No. 08/566,677 and relates to a unit that replaces a conventional switch or plug receptacle for controlling any electrical load, such as a light fixture or appliance, in response to a power failure.

Frequently, homes, offices, and industrial plant facilities experience many types of emergency situations involving power failures where an interior or exterior area has no light. The power failures may be caused by electrical short circuits, brownouts, fire, accidents, natural disasters (i.e., floods, hurricanes, tornadoes, etc.), or a planned shutoff of electricity to a facility or dwelling. As a result of these emergencies, most facilities, and especially residential homes, do not have emergency generators to provide lighting, or they only have emergency lighting in the form of portable light sources, such as flashlights.

A need exists for a simple and easily installable wireless emergency light source which includes a fixedly-attached housing for replacement of standard switch plates and plug receptacles and which activates itself in response to a power failure of any kind.

DESCRIPTION OF THE PRIOR ART

Switch plate devices having an illumination source and/or having a rechargeable flashlight contained thereon are commercially available and have been disclosed in the prior art. For example, U.S. Pat. No. 4,514,789 discloses a housing on a switch plate having an LED to locate a light switch in the dark. U.S. Pat. No. 4,611,264 discloses a housing adhesively attached to a switch plate having a light to locate the light switch in the dark. The housing can be removed and used as a flashlight.

The prior art devices do not disclose a housing which is easily installable and mechanically connectable to a conventional light switch to provide automatic illumination to an area when a power failure occurs.

Accordingly, it is a primary object of the present invention to provide a simple and easily installable wireless emergency safety light which includes a housing for the replacement of a standard switch plate or standard receptacle plate and which activates itself in response to a power failure of any kind.

Another object of the present invention is to provide a housing for a wireless emergency safety light which is mechanically connectable to a conventional light switch.

Another object of the present invention is to provide a wireless emergency safety light which is battery operated and can operate with different types of light sources, such as LED lamps, a fluorescent lamp, an incandescent lamp, or an electroluminescent film.

Another object of the present invention is to provide a wireless emergency safety light which has an antenna sensing device for sensing a power failure and automatically actuating the emergency light source.

Another object of the present invention is to provide a wireless emergency safety light in which an antenna sensing device is capable of receiving a radio frequency signal that is emitted from all electrical wiring when electrical current is present, such that the antenna sensing device detects the presence and/or loss of electrical power and activates the wireless emergency safety light.

A further object of the present invention is to provide a multi-position switch for selecting a motion sensor, a timer, a night light, or a photocell.

A still further object of the present invention is to provide a housing for a wireless emergency safety light which can be mass produced in an automated and economical manner and is relatively inexpensive.

SUMMARY OF THE INVENTION

The present invention provides a housing having a wireless emergency safety light which is mechanically connectable to a conventional electrical switch or a plug receptacle for providing power to a light fixture or other electrical load in response to a loss of electrical power. The housing replaces a conventional switch plate having at least one opening for receiving the switch actuator of the light switch or for receiving the electrical plug receptacle. The emergency safety light includes at least one compartment in the housing for receiving batteries; a second compartment in the housing for receiving an emergency light source adapted to be connected to the batteries; and an antenna for sensing the loss of electrical power to the light switch and, response thereto, for actuating the emergency light source.

BRIEF DESCRIPTION OF THE DRAWINGS

Further objects, features, and advantages of the present invention will become apparent upon consideration of the detailed description of the presently-preferred embodiments, when taken in conjunction with the accompanying drawings, wherein.

DETAILED DESCRIPTION OF THE PREFERRED AND ALTERNATE EMBODIMENTS

Figure 8:
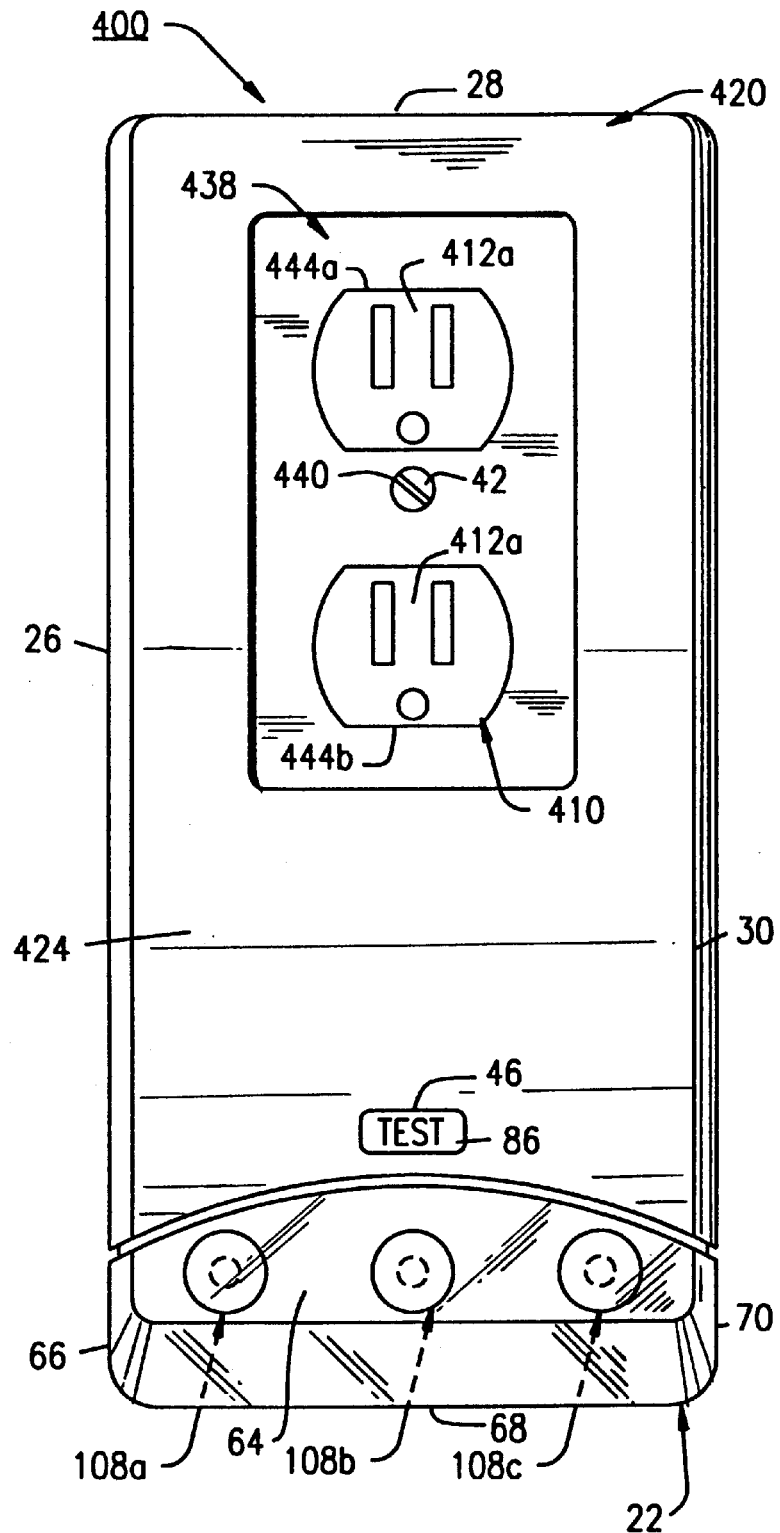
FIG. 8 is a front view of the wireless emergency safety light of the fourth embodiment of the present invention showing the safety light in operational use with a double three-prong wall plug of a wall receptacle junction box.
Figure 9:
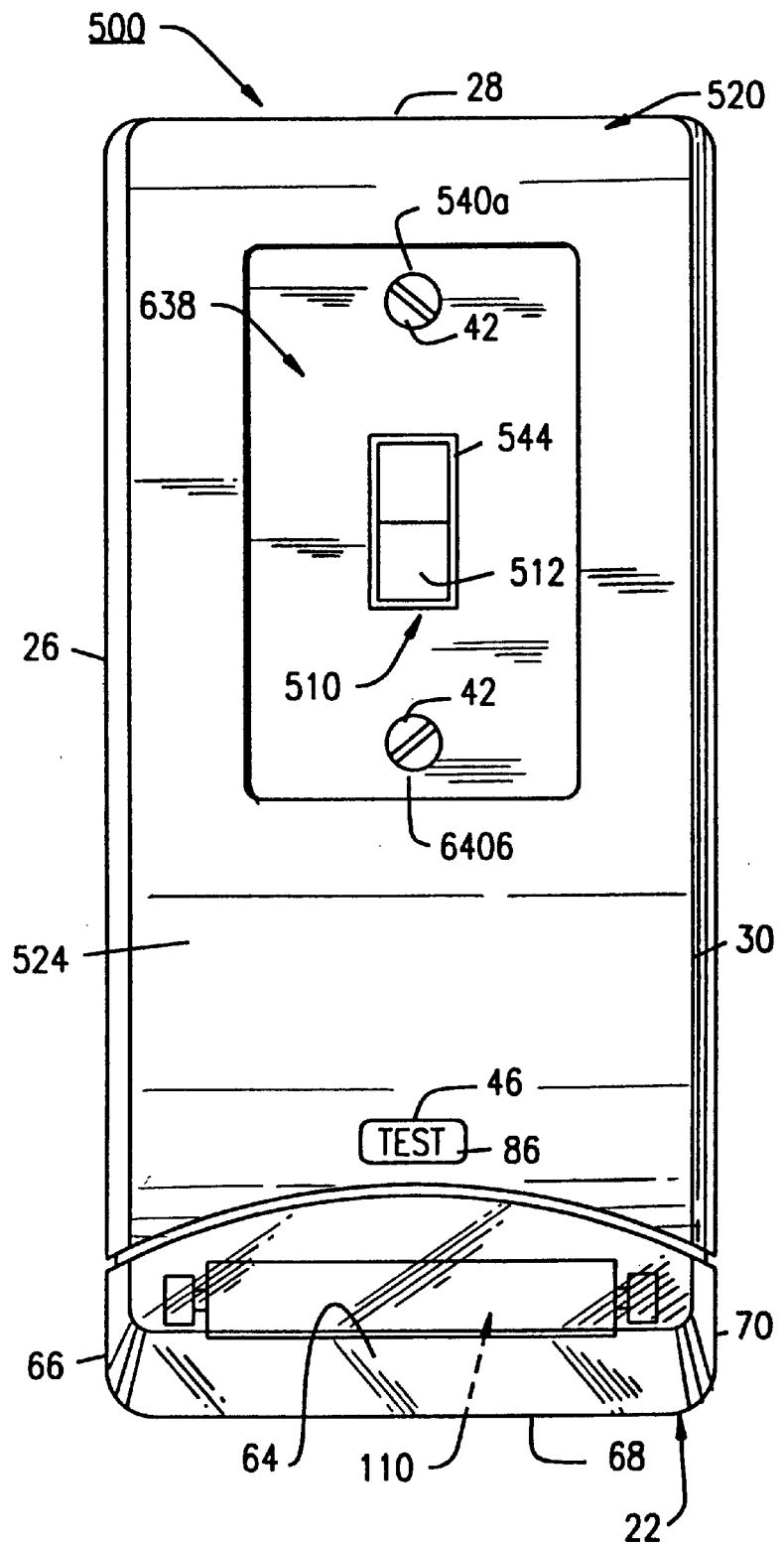
FIG. 9 is a front view of the wireless emergency safety light of the fifth embodiment of the present invention showing the safety light in operational use with a standard size rocker switch of a wall junction box.
Figure 10:
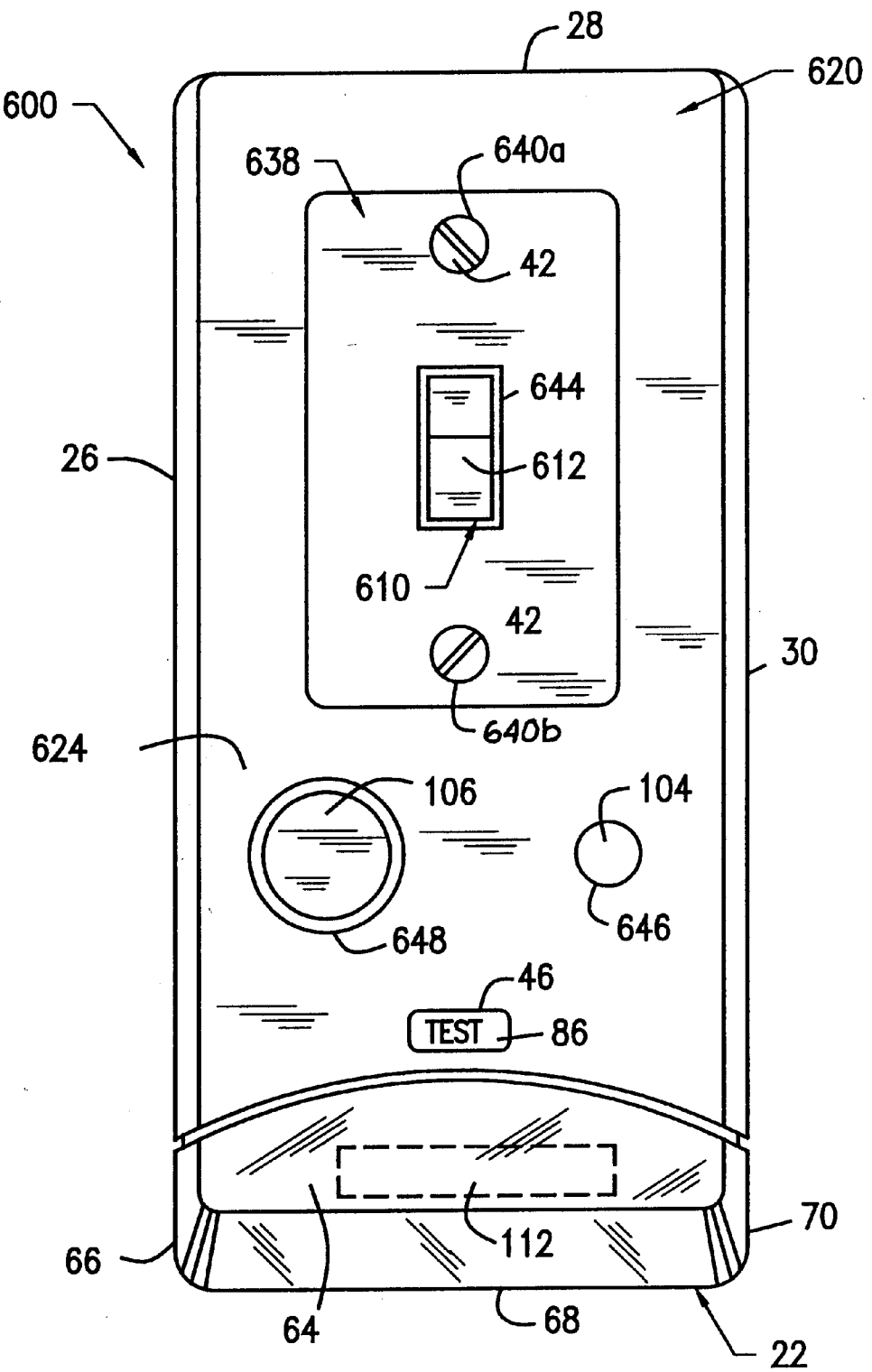
FIG. 10 is a front view of the wireless emergency safety light of the sixth embodiment of the present invention showing the safety light in operational use with a bottom switch of a wall junction box, and in use with a photocell sensor, a night light, and/or a motion sensor.

The wireless emergency safety light and its component parts of the first preferred embodiment 10 and its alternate embodiments 200, 300, 400, 500 and 600 are represented in detail by FIGS. 1 through 11 of the drawings. The wireless emergency safety lights 10, 200, 300, 400, 500 and 600 provide for automatic illumination of a pre-determined area when a power failure occurs. As shown in FIGS. 6 through 11, the alternate embodiments 200, 300, 400, 500 and 600 differ from the first preferred embodiment 10 only in the design and configuration of the front wall 24 of housing 20 having an upper cavity section 38 therein which is different. Additionally, the sixth embodiment 600 further includes a photocell sensor 104, a motion sensor 106, and a night light within an alternate electrical assembly 80' for the wireless emergency safety light 600, as shown in FIG. 10 of the drawings. In all other respects, the wireless emergency safety lights 200, 300, 400, 500 and 600 of the alternate embodiments function and operate in the same manner as the wireless emergency safety light 10 of the first preferred embodiment.

DETAILED DESCRIPTION OF THE FIRST EMBODIMENT

The first embodiment of the present invention provides for a wireless emergency safety light 10, as represented in detail by FIGS. 1 through 5 of the drawings. The wireless emergency safety light 10 includes a housing 20 having a lower lens cover section 22. The housing 20 includes a front wall 24, side walls 26, 28 and 30, a bottom wall 32 for receiving the lens cover section 22, a rear wall 34, and an interior cavity 36 for holding in place an electrical assembly 80 therein. Front wall 24 includes an upper cavity section 38 having a pair of mounting hole openings 40a and 40b for receiving mounting screws 42 for mounting housing 20 to the wall junction box assembly 120; and a rectangular shaped switch opening 44 for receiving wall switch 122 of the wall junction box assembly 120. In addition, front wall 24 also includes a test switch opening 46 for receiving a test switch actuator 86 attached to electrical assembly 80. Mounting screws 42 attach the wall junction box assembly 120 via mounting openings 124a and 124b of mounting brackets 126a and 126b, respectively.

Rear wall 34 within the interior cavity 36 further includes a pair of battery compartments 50 and 52 each having a battery spring contact board 54 and 56 and each having a battery contact back plate 58 and 60 for receiving a plurality of AA alkaline batteries 62, being used as the main power supply source in case of a power failure.

Figure 1:
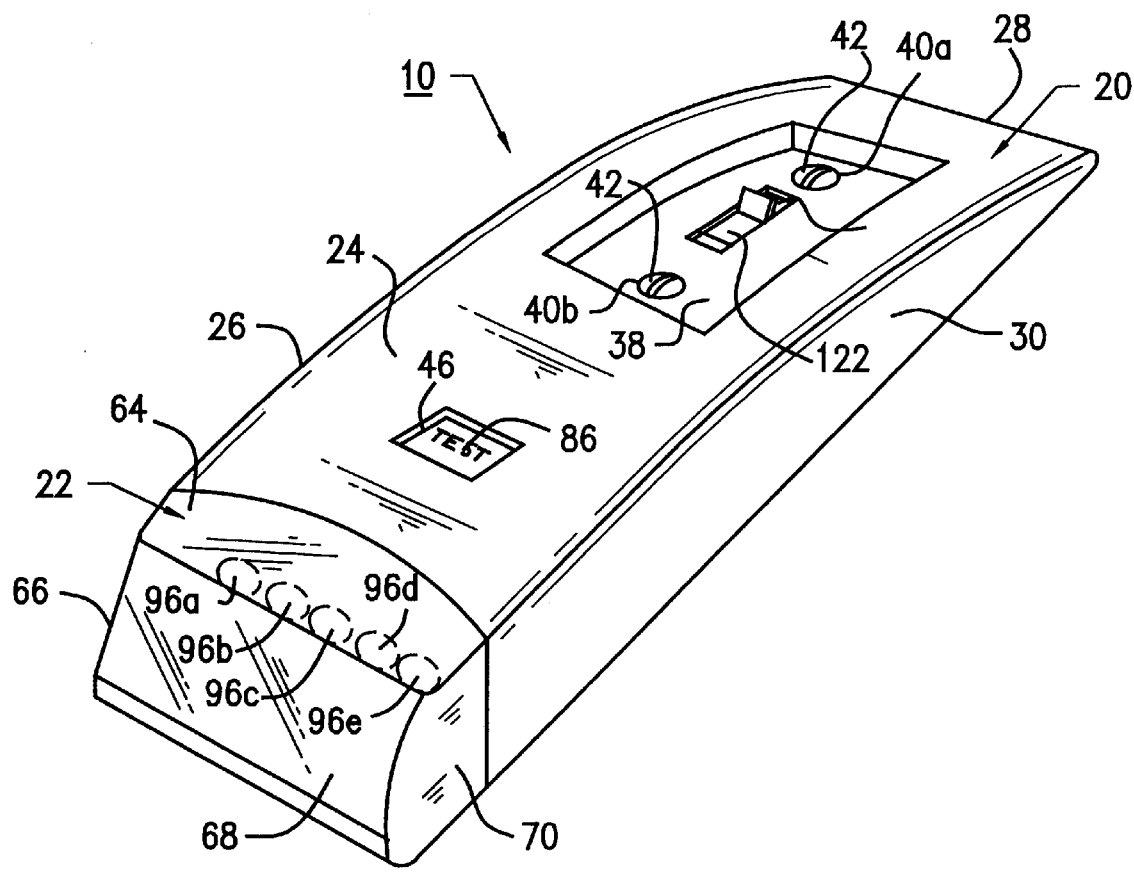
FIG. 1 is a front perspective view of the wireless emergency safety light of the first embodiment of the present invention showing the safety light in operational use with a single wall switch of a wall junction box.
Figure 2:
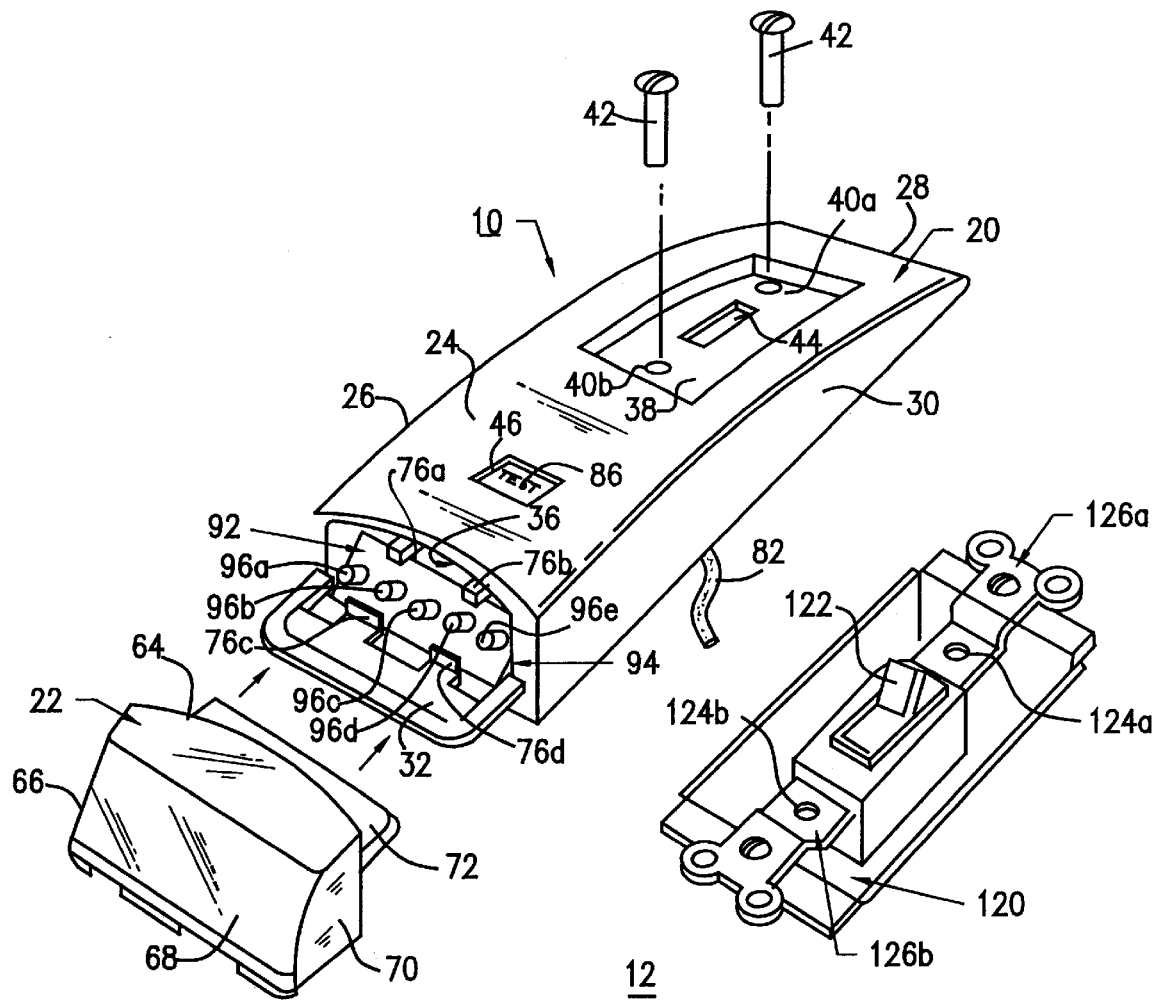
FIG. 2 is an exploded front perspective view of the wireless emergency safety light of the first embodiment of the present invention showing the major component parts contained therein and in use with a wall junction box.
Figure 3:
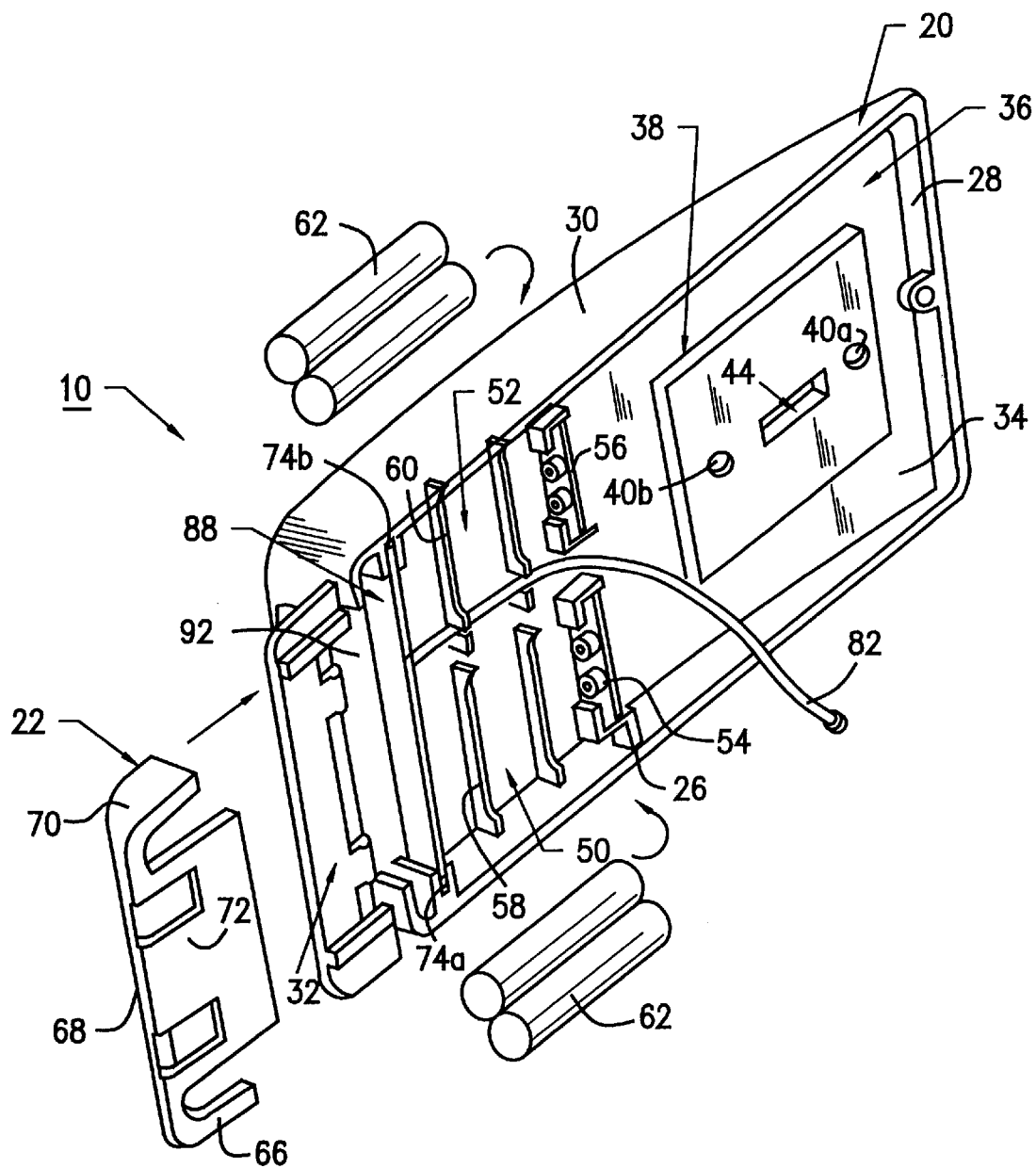
FIG. 3 is an exploded rear perspective view of the wireless emergency safety light of the first embodiment of the present invention showing the major component parts contained therein and with the lens cover section being connectable to the main housing.

In addition, rear wall 34 also includes an integrally attached pair of slotted wall bracket holders 74a and 74b for holding in place the main PC board 88, and bracket holders 76a, 76b, 76c, and 76d for holding in place the LED PC board 92, as depicted in FIGS. 2 and 3 of the drawings.

Lens cover section 22 includes a front wall 64, side walls 66, 68, 70 and a bottom wall 72 for interfitting with the bottom wall 32 of housing 20, as shown in FIG. 3 of the drawings.

Figure 4:
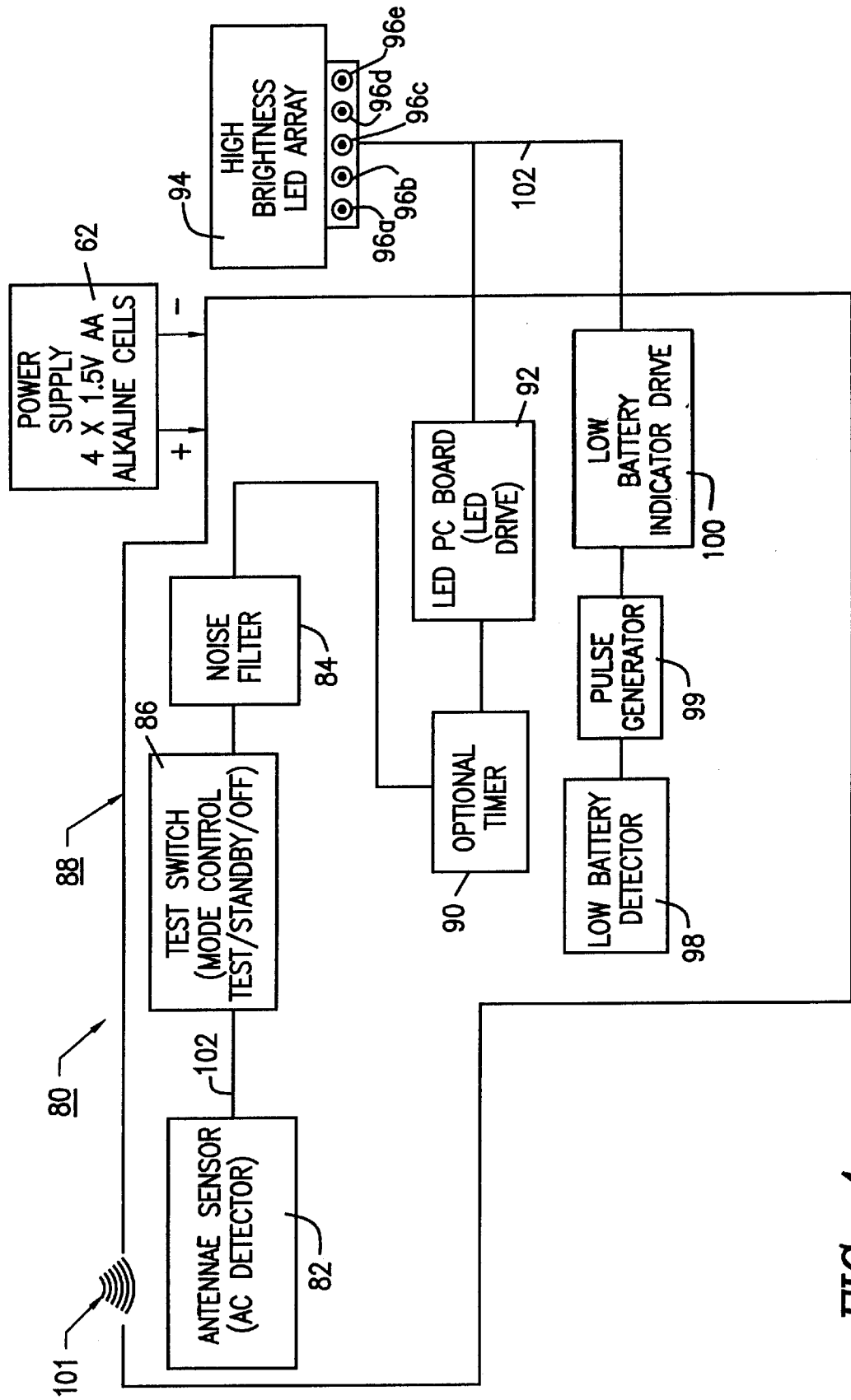
FIG. 4 is an electrical block diagram of the wireless emergency safety light of the present invention showing the major electrical components of the electrical assembly.
Figure 5:
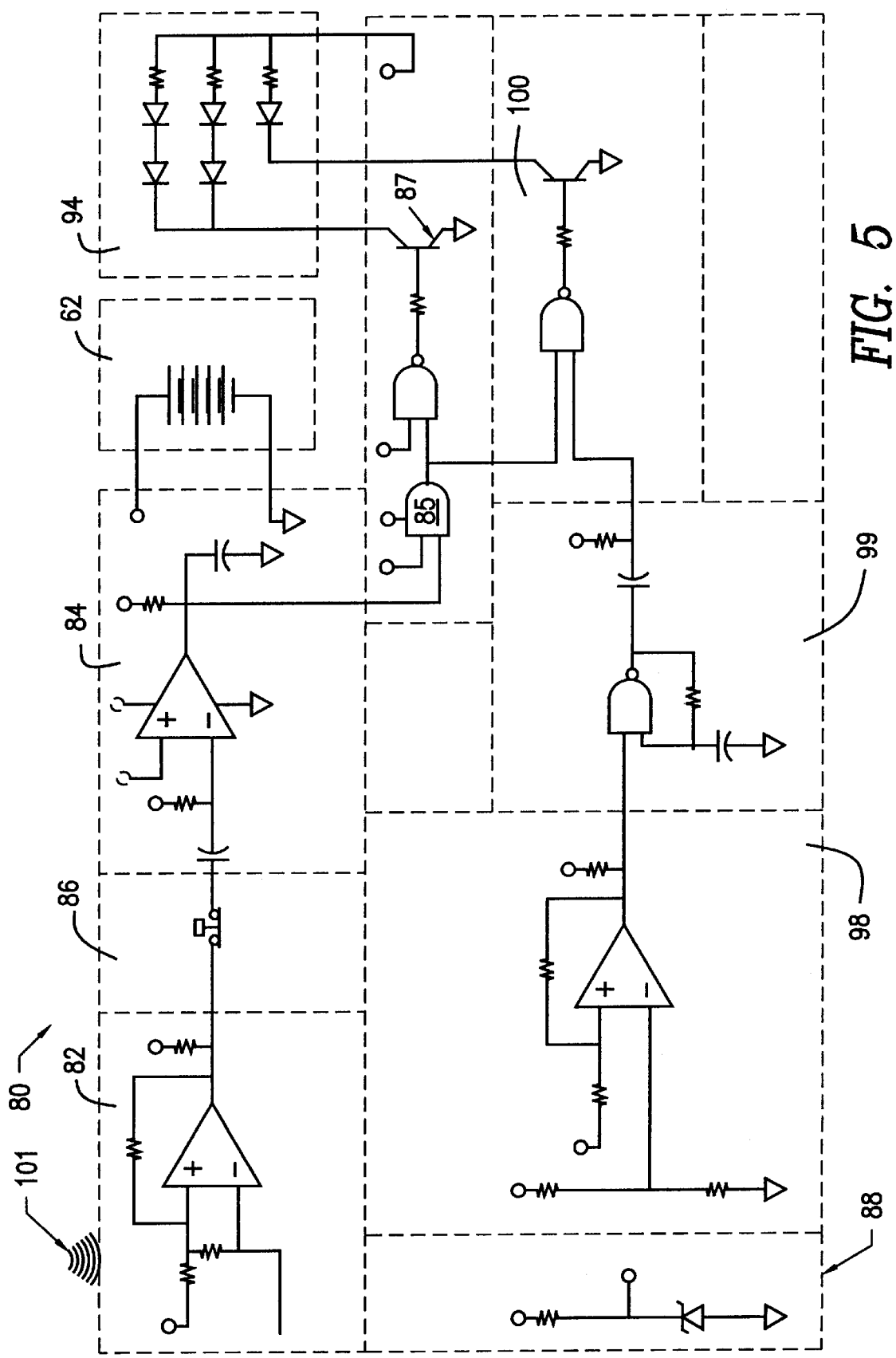
FIG. 5 is an electrical circuit schematic diagram of the wireless emergency safety light of the present invention showing the major electrical circuit components contained therein of the electrical assembly.

Electrical assembly 80, as shown in FIGS. 4 and 5 of the drawings, includes an antenna sensing device 82 for sensing the loss of electrical power to the junction wall box 120; a noise filter 84 for filtering out extraneous electrical signals; a logic gate(s) 85 for amplifying the signal transmitted from noise filter 84; a test switch 86 for testing of the various mode controls, stand by position or off position within the electrical assembly 80; a low battery detector 98, a pulse generator 99, and a low battery indicator drive 100. The main PC board 88 provides for the electrical operation of these electrical components 82, 84, 85, 86, 98, 99, and 100 of electrical assembly 80. In addition, electrical assembly 80 further includes a photocell or timer 90 for the option of turning "On" of the safety light 10 during night-time hours; an LED PC board 92; and an LED PC array component 94 having a plurality of LED lamps 96a to 96e. Wire 102 provides the electrical connection between PC board 88, PC board 92, and LED PC array 94.

SECOND EMBODIMENT 200

Figure 6:
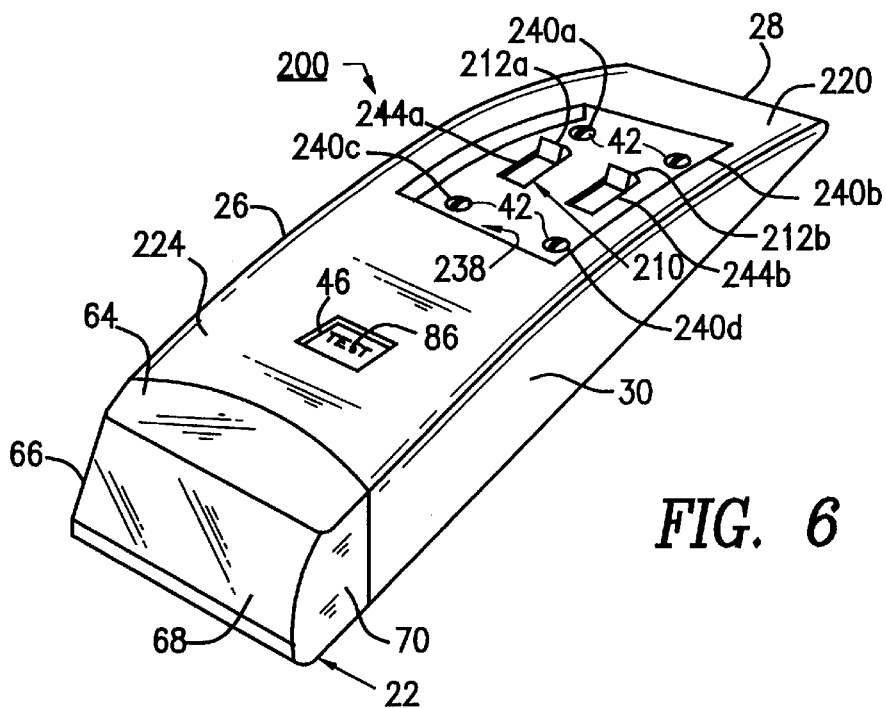
FIG. 6 is a front perspective view of the wireless emergency safety light of the second embodiment of the present invention showing the safety light in operational use with a double wall switch of a wall junction box.

The wireless emergency safety light of the second embodiment 200 of the present invention is depicted in detail by FIG. 6 of the drawings. All aspects of the wireless emergency safety light 200 of the second embodiment are the same as the wireless emergency safety light 10 of the first embodiment, except for the design and configuration of the front wall 224 having an upper cavity section 238 of housing 220. Safety light 200 includes a housing 220 having a front wall 224 with an upper cavity section 238. Upper cavity section 238 includes a plurality of mounting hole openings 240a, 240b, 240c, and 240d for receiving mounting screws 42 for mounting housing 220 to the wall junction box assembly 210; and a pair of rectangular-shaped switch openings 244a and 244b for receiving wall switches 212a and 212b of the wall junction box assembly 210. In all other respects, the wireless emergency safety light 200 of the second embodiment functions and operates in use in the same manner as the wireless emergency safety light 10 of the first embodiment.

THIRD EMBODIMENT 300

Figure 7:
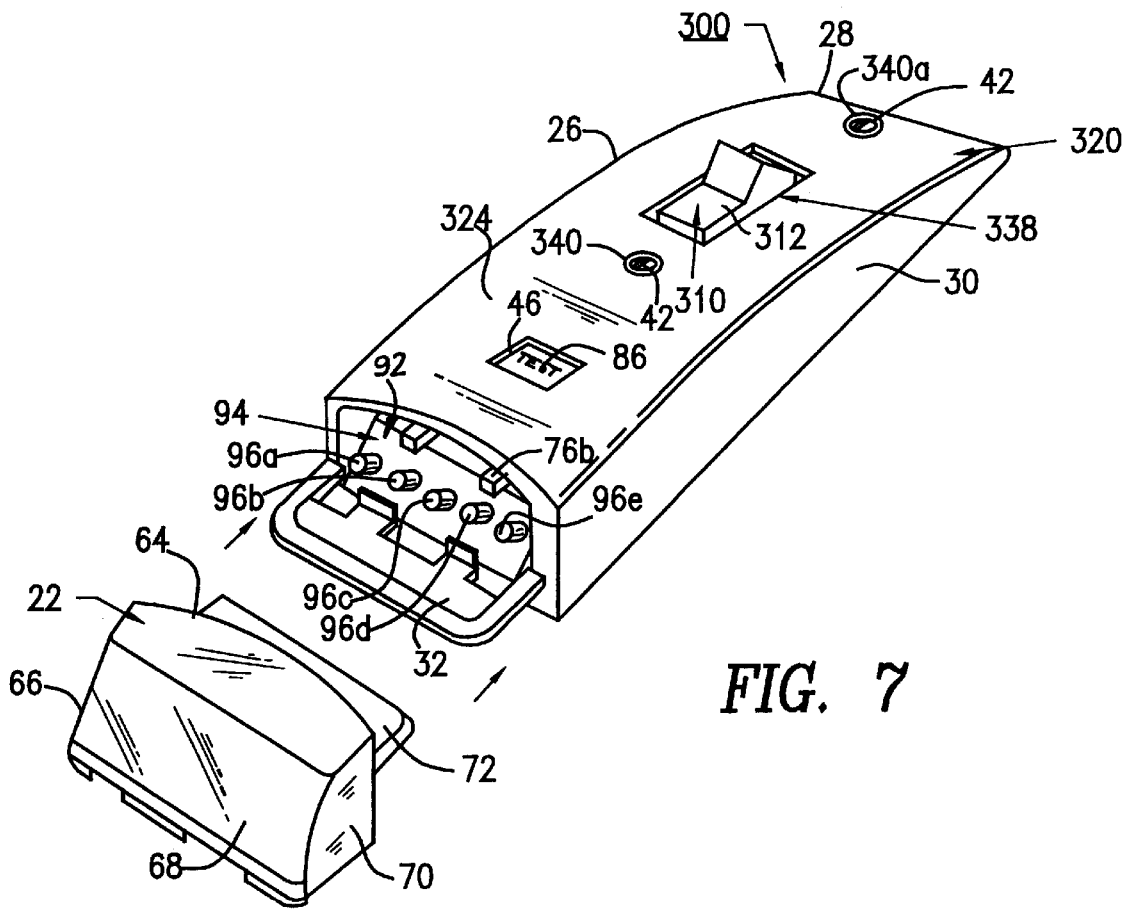
FIG. 7 is a front perspective view of the wireless emergency safety light of the third embodiment of the present invention showing the safety light in operational use with a large-sized rocker switch of a wall junction box.

The wireless emergency safety light of the third embodiment 300 of the present invention is depicted in detail by FIG. 7 of the drawings. All aspects of the wireless emergency safety light 300 of the third embodiment are the same as the wireless emergency safety light 10 of the first embodiment, except for the design and configuration of the front wall 324 having an upper cavity section 338 of housing 320. Safety light 300 includes a housing 320 having a front wall 324 with an upper cavity section 338. Front wall 324 includes a pair of mounting hole openings 340a and 340b for receiving mounting screws 42 for mounting housing 320 to the wall junction box assembly 310. Upper cavity section 338 includes a rectangular-shaped switch opening 344 for receiving one or more enlarged rocker switches 312 of the wall junction box assembly 310. In other respects, the wireless emergency safety light 300 of the third embodiment functions and operates in use in the same manner as the wireless emergency safety light 10 of the first embodiment.

FOURTH EMBODIMENT 400

The wireless emergency safety light of the fourth embodiment 400 of the present invention is depicted in detail by FIG. 8 of the drawings. All aspects of the wireless emergency safety light 400 of the fourth embodiment are the same as the wireless emergency safety light 10 of the first embodiment, except for the design and configuration of the front wall 424 having an upper cavity section 438 of housing 420. Safety light 400 includes a housing 420 having a front wall 424 with an upper cavity section 438. Upper cavity section 438 includes a mounting hole opening 440 for receiving mounting screws 42 for mounting housing 420 to the wall receptacle junction box assembly 410; and a pair of substantially rectangular-shaped receptacle openings 444a and 444b for receiving two or more wall receptacles 412a and 412b, respectively, of the wall receptacle junction box assembly 410. Additionally, safety light 400 uses a plurality of incandescent lamps 108a to 108c in place of the LED lamps 96a to 96e of the wireless emergency safety light 10 for providing a light source when a power failure occurs. In all other respects, the wireless emergency safety light 400 of the fourth embodiment functions and operates in use in the same manner as the wireless emergency safety light 10 of the first embodiment.

FIFTH EMBODIMENT 500

The wireless emergency safety light of the fifth embodiment 500 of the present invention is depicted in detail by FIG. 9 of the drawings. All aspects of the wireless emergency safety light 500 of the fifth embodiment are the same as the wireless emergency safety light 10 of the first embodiment, except for the design and configuration of the front wall 524 having an upper cavity section 538 of housing 520. Safety light 500 includes a housing 520 having a front wall 524 with an upper cavity section 538. Upper cavity section 538 includes a pair of mounting hole openings 540a and 540b for receiving mounting screws 42 for mounting housing 520 to the wall junction box assembly 510, and a rectangular-shaped opening 544 for receiving a rocker switch 512 of wall junction box assembly 510. Additionally, safety light 500 uses a fluorescent lamp 110 in place of the LED lamps 96a to 96e of the wireless emergency safety light 10 for providing a light source when a power failure occurs. In all other respects, the wireless emergency safety light 500 of the fifth embodiment functions and operates in use in the same manner as the wireless emergency safety light 10 of the first embodiment.

SIXTH EMBODIMENT 600

The wireless emergency safety light of the sixth embodiment 600 of the present invention is depicted in detail by FIG. 10 of the drawings. All aspects of the wireless emergency safety light 600 of the sixth embodiment are the same as the wireless emergency safety light 10 of the first embodiment, except for the design and configuration of the front wall 624 having an upper cavity section 638 of housing 620, as well as additional electrical components of a photocell sensor 104 and a motion sensor 106 of the alternate electrical assembly 80'.

In addition, front wall 624 also include openings 646 and 648 for receiving the photocell sensor 104 and the motion sensor 106, respectively. Safety light 600 includes a housing 620 having a front wall 624 with an upper cavity section 638. Upper cavity section 638 includes a pair of mounting hole openings 640a and 640b for receiving mounting screws 42 for mounting housing 620 to the wall junction box assembly 610; and a rectangular-shaped opening 644 for receiving a button switch 612 of wall junction box assembly 610. Alternatively, safety light 600 may use an electroluminescent device 112, instead of LED lamps 96a to 96e, for providing the emergency light source.

Figure 11:
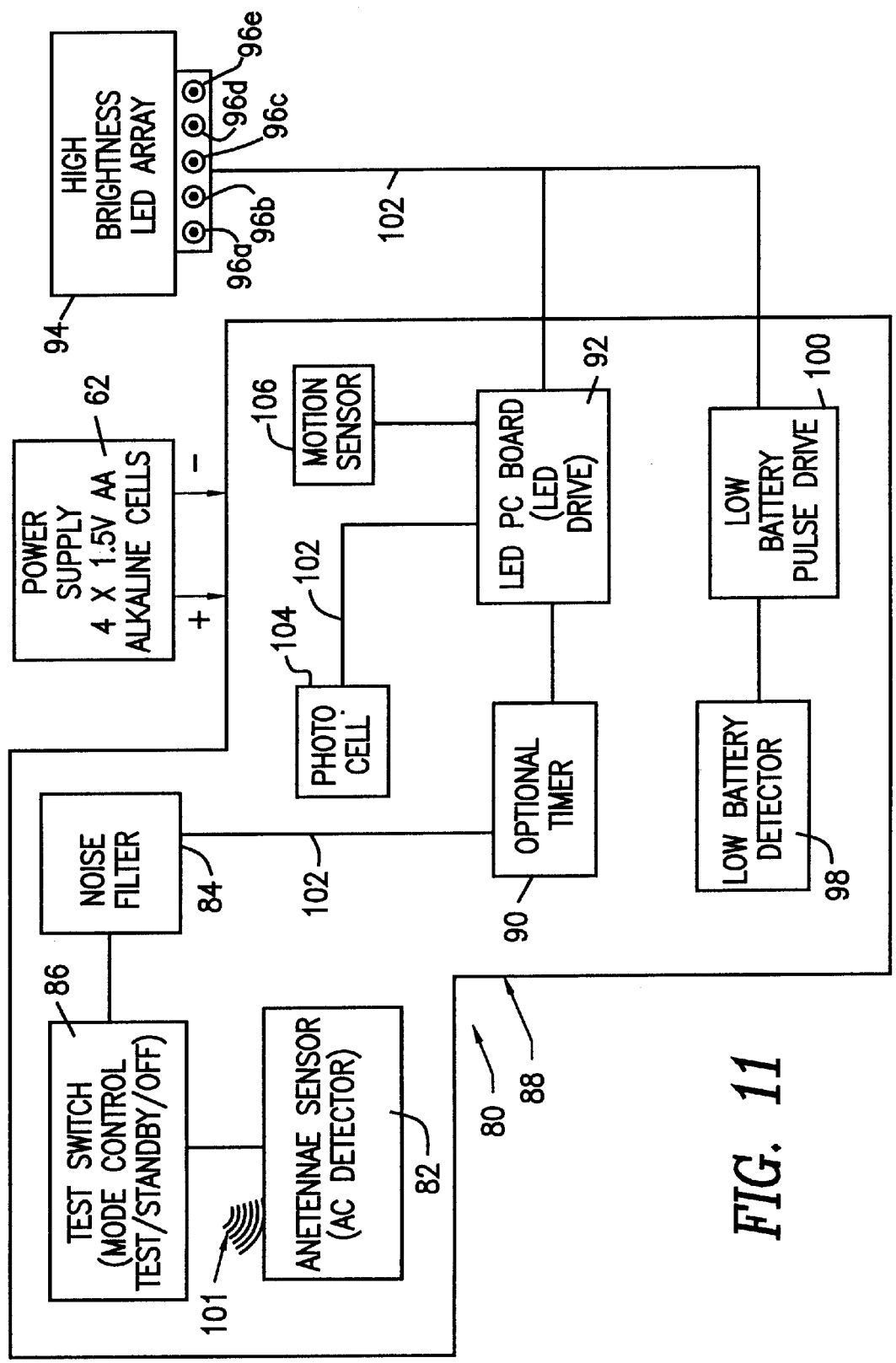
FIG. 11 is an electrical functional diagram of the wireless emergency safety light of the present invention showing the major electrical components of the alternate electrical assembly.

The alternate electrical assembly 80', as shown in FIG. 11 of the drawings, includes a photocell sensor 104 for automatically turning ON and OFF the LED lamps 96a to 96e when they are being used as a night light; and electrical assembly 80' also includes a motion sensor 106 for actuating the LED lamps 96a to 96e in response to when a person enters the room and passes the motion sensor 106. In all other respects, the wireless emergency safety light 600 of the sixth embodiment functions and operates in use in the same manner as the wireless emergency safety light 10 of the first embodiment.

OPERATION OF THE PRESENT INVENTION

In operation, the wireless emergency safety light 10 is a self-contained emergency lighting housing 20 that attaches to an existing wall switch junction box 120 or receptacle junction box 410, as shown in FIGS. 2 and 8 of the drawings. This safety light 10 automatically turns on the emergency LED lamps 96a to 96e when the antenna sensing device 82 senses the loss of electrical power.

In use, the safety light 10 is powered by four (4) replaceable AA alkaline batteries 62 which, in turn, power the flexible antenna sensing device 82 such that it will receive a radio frequency signal 101 that is emitted from all electrical wiring, as in a wall junction box 12, when electrical current is present. This antenna sensing device 82 detects the presence and/or loss of power.

The replaceable batteries 62 are placed in the open battery compartments 50 and 52 by the user in the interior cavity 36 of the housing 20 and are held in place with battery spring clips 54 and 56. To install the unit the consumer must first shut off the power to the electrical location so that the user may then install the safety light 10 in a safe manner. The user then removes the two or more screws 42 that hold the existing switch plate (not shown) to the wall switch junction box 120 in the wall 12 (or the one or more screws 42 that hold the receptacle plate cover (not shown) to the wall 12). The consumer then places the full length of the flexible insulated wire antenna sensing device 82 into the exposed junction box 120 making sure to place it close to the wiring in the wall junction box 120. The switch opening 44 is then placed over the exposed wall switch(s) 122 (or receptacle(s) 412a and 412b) and attached with the same number of screws 42 originally removed.

Once the power is turned back on the wireless emergency safety light 10 remains unlit and in the ready position to detect a power loss. A test button or switch 86 is included on the front wall 24 of the housing 20 for the consumer to test the batteries 62 by pressing this test button 86 and observing the LED lamps 96a to 96e being lit while the test button 86 is depressed.

When the electrical assembly 80 is in its operational mode, the wireless emergency safety light 10 is in its ready and ON position, and if there is loss of power at the switch junction box 120, the following electrical sequence occurs. The antenna sensing device 82 senses the loss of electrical power by the cessation of electrical pulses or electrical signals 101, whereas the noise filter 84 filters out extraneous electrical signals and high-frequency noise signals. When the loss of electrical pulses occurs, noise filter 84 emits a high logic level electrical signal (not shown), which is then received by the logic gates 85. The logic gates 85 then act as a buffer and amplify the high logic level signal transmitted from the noise filter 84, and this amplified signal is transmitted to the switching transistor (Q1) 87. Transistor Q1 (87) then turns on and supplies power to the LED PC array component 94. The LED PC array component 94 then turns on the plurality of emergency LED lights 96a to 96e or the alternative emergency lights 108, 110, or 112. Electrical assembly 80' operates in a similar manner.

When the batteries 62 start to lose their charge the low battery detector 98 of electrical assembly 80 notifies the user of this low battery level by the blinking of one of the LED lamps 96a to 96e or other light sources to notify the user that the batteries 62 have to be changed.

ADVANTAGES OF THE PRESENT INVENTION

Accordingly, a primary advantage of the present invention is that it provides a simple and easily installable wireless emergency safety light which includes a fixedly-attached housing for the replacement of a standard switch plate or standard receptacle plate and which activates itself in response to a power failure of any kind.

Another advantage of the present invention is that it provides a housing for a wireless emergency safety light which is mechanically connectable to a conventional light switch.

Another advantage of the present invention is that it provides a wireless emergency safety light which is battery operated and can operate with different types of light sources, such as LED lamps, a fluorescent lamp, an incandescent lamp, or an electroluminescent film.

Another advantage of the present invention is that it provides a wireless emergency safety light which has an antenna sensing device for sensing a power failure and for automatically actuating the emergency light source.

Another advantage of the present invention is that it provides for a wireless emergency safety light in which an antenna sensing device is capable of receiving a radio frequency signal that is emitted from all electrical wiring when electrical current is present, such that the antenna sensing device detects the presence and/or loss of electrical power and activates the wireless emergency safety light.

A further advantage of the present invention is that it provides a multi-position switch for selecting a motion sensor, a timer, a night light, or a photocell.

A still further advantage of the present invention is that it provides a housing for a wireless emergency safety light which can be mass produced in an automated and economical manner and is relatively inexpensive.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A housing for an emergency light source which is mechanically connectable to an electrical switch having a switch actuator or a plug receptacle for providing power to a light fixture or other electrical load, comprising:
   a) a replacement housing for replacement of a conventional switch plate or conventional plate for a plug receptacle, said replacement housing having at least one opening for receiving said switch actuator of said electrical switch or for receiving said electrical plug receptacle; means for mechanically connecting said replacement housing to said electrical switch or said plug receptacle; said replacement housing having no electrical connection to said conventional switch plate or to said plug receptacle;
   b) at least one compartment in said replacement housing for receiving batteries;
   c) a second compartment in said replacement housing for receiving an emergency light source adapted to be connected to said batteries; and
   d) wireless means for sensing the loss of electrical power to said electrical switch or said plug receptacle and, in response thereto, for actuating said emergency light source.

2. A housing in accordance with claim 1, wherein said wireless means for sensing includes an antenna for sensing the loss of electrical power.

3. A housing in accordance with claim 1, wherein said replacement housing includes a pair of compartments for receiving batteries.

4. A housing in accordance with claim 3, wherein said pair of compartments are adapted to receive two "AA" batteries each.

5. A housing in accordance with claim 1, wherein said second compartment is adapted to receive one or more LED lamps, incandescent lamps, fluorescent lamps, or electroluminescent devices as said emergency light source.

6. A housing in accordance with claim 1, further including a PC board containing said wireless means for sensing.

7. A housing in accordance with claim 1, further including a manual test switch for testing the functioning of said emergency light source.

8. A housing in accordance with claim 1, wherein said replacement housing includes a switch plate cover having at least one light switch opening or a receptacle cover having at least one pair of receptacle openings.

9. A housing in accordance with claim 1, wherein said replacement housing includes a diffuser cover for diffusing light from said light source.

10. A housing in accordance with claim 1, wherein said replacement housing includes a compartment for receiving at least one printed circuit board.

11. A housing in accordance with claim 1, further including a photocell for controlling said emergency light source.

12. A housing for an emergency light source which is mechanically connectable to an electrical switch having a switch actuator or a plug receptacle for providing power to a light fixture or other electrical load, comprising:
   a) a replacement housing for replacement of a conventional switch plate having at least one opening for receiving said switch actuator of said electrical switch or for receiving said electrical plug receptacle; means for mechanically connecting said replacement housing to said electrical switch or said plug receptacle; said replacement housing having no electrical connection to said conventional switch plate or to said plug receptacle;
   b) at least one compartment in said replacement housing for receiving batteries;

c) a second compartment in said replacement housing for receiving an emergency light source adapted to be connected to said batteries;

d) wireless means for sensing the loss of electrical power to said electrical switch or said plug receptacle and, in response thereto, for actuating said emergency light source; and e) a night light mounted in said replacement housing.

13. A housing in accordance with claim 12, wherein said wireless means for sensing includes an antenna for sensing the loss of electrical power.

14. A housing in accordance with claim 12, wherein said second compartment is adapted to receive one or more LED lamps, incandescent lamps, fluorescent lamps, or electroluminescent devices as said emergency light source.

15. A housing for an emergency light source which is mechanically connectable to an electrical switch having a switch actuator for a plug receptacle for providing power to a light fixture or other electrical load, comprising:

a) a replacement housing for replacement of conventional switch plate having at least one opening for receiving said switch actuator of said electrical switch or for receiving said electrical plug receptacle; means for mechanically connecting said replacement housing to said electrical switch or said plug receptacle; said replacement housing having no electrical connection to said conventional switch plate or to said plug receptacle;

b) at least one compartment in said replacement housing for receiving batteries;

c) a second compartment in said replacement housing for receiving an emergency light source adapted to be connected to said batteries;

d) wireless means for sensing the loss of electrical power to said electrical switch or said plug receptacle and, in response thereto, for actuating said emergency light source;

e) a night light mounted in said replacement housing;

f) a photocell mounted in said replacement housing for actuating said electrical switch or said plug receptacle in response to a power failure and when there is no ambient light; and g) a timer mounted in said replacement housing for controlling the time that the batteries are operating.

16. A housing in accordance with claim 15, further including a manual test switch for testing the functioning of said emergency light source.

17. A housing in accordance with claim 15, further including a photocell for controlling said night light.

18. A housing in accordance with claim 15, wherein said wireless means for sensing includes an antenna for sensing the loss of electrical power.

19. A housing in accordance with claim 15, wherein said second compartment is adapted to receive one or more LED lamps, incandescent lamps, fluorescent lamps, or electroluminescent devices as said emergency light source.

20. A housing for an emergency light source which is mechanically connectable to an electrical switch having a switch actuator or a plug receptacle for providing power to a light fixture or other electrical load, comprising:

a) a replacement housing for replacement of a conventional switch plate having at least one opening for receiving said switch actuator of said electrical switch or for receiving said electrical plug receptacle;

b) means for connecting batteries to said replacement housing;

c) a compartment in said replacement housing for receiving an emergency light source adapted to be connected to said batteries;

d) wireless means for sensing the loss of electrical power to said electrical switch or said plug receptacle and, in response thereto, for actuating said emergency light source;

e) means for mechanically connecting said replacement housing to said electrical switch or said plug receptacle; said replacement housing having no electrical connection to said conventional switch plate or to said plug receptacle;

f) a motion sensor mounted in said replacement housing for actuating said emergency light source in response to an actuating movement;

g) a timer mounted in said replacement housing for controlling the amount of time said batteries operate;

h) a photocell mounted in said replacement housing for actuating said electrical switch or said plug receptacle in response to a power failure and when there is no ambient light; and i) a switch for selecting said motion sensor, said timer or said photocell for controlling said electrical switch or said plug receptacle.

21. A housing in accordance with claim 20, further including a manual test switch for testing the functioning of said emergency light source.

22. A housing in accordance with claim 20, further including a night light and a photocell for controlling said night light.

23. A housing in accordance with claim 20, wherein said timer is a digital timer.

24. A housing in accordance with claim 20, wherein said wireless means for sensing includes an antenna for sensing the loss of electrical power.

25. A housing in accordance with claim 20, wherein said second compartment is adapted to receive one or more LED lamps, incandescent lamps, fluorescent lamps, or electroluminescent devices as said emergency light source.

26. A housing in accordance with claim 2, wherein said wireless means for sensing further includes a noise filter for emitting an electrical signal; at least one logic gate for receiving and amplifying said electrical signal from said noise filter; a switching transistor for receiving and transmitting said electrical signal to a LED PC device; and said LED PC device for turning on and supplying power to said light source.

27. A housing in accordance with claim 1, wherein said means for mechanically connecting said replacement housing to said electrical switch or said plug receptacle include a plurality of mounting screws.

28. A housing in accordance with claim 12, wherein said means for mechanically connecting said replacement housing to said electrical switch or said plug receptacle include a plurality of mounting screws.

29. A housing in accordance with claim 15, wherein said means for mechanically connecting said replacement housing to said electrical switch or said plug receptacle include a plurality of mounting screws.

30. A housing in accordance with claim 20, wherein said means for mechanically connecting said replacement housing to said electrical switch or said plug receptacle include a plurality of mounting screws.

\* \* \* \* \*